United States Patent
Baldinger

(10) Patent No.: US 10,124,317 B2
(45) Date of Patent: Nov. 13, 2018

(54) APPARATUS AND METHOD FOR AVOIDING FLUID BYPASS IN PARTICULATE FILTERS

(71) Applicant: Columbus Industries, Inc., Ashville, OH (US)

(72) Inventor: Russell L. Baldinger, Circleville, OH (US)

(73) Assignee: Columbus Industries, Inc., Ashville, OH (US)

( * ) Notice: Subject to any disclaimer, the term of this patent is extended or adjusted under 35 U.S.C. 154(b) by 465 days.

(21) Appl. No.: 14/809,606

(22) Filed: Jul. 27, 2015

(65) Prior Publication Data

US 2016/0023186 A1  Jan. 28, 2016

Related U.S. Application Data

(60) Provisional application No. 62/029,049, filed on Jul. 25, 2014.

(51) Int. Cl.
| | |
|---|---|
| *B01D 53/02* | (2006.01) |
| *B01J 20/28* | (2006.01) |
| *B01D 53/04* | (2006.01) |
| *B01J 20/20* | (2006.01) |
| *B01D 53/72* | (2006.01) |
| *B01D 53/82* | (2006.01) |

(52) U.S. Cl.
CPC ........ *B01J 20/28045* (2013.01); *B01D 53/04* (2013.01); *B01D 53/72* (2013.01); *B01D 53/82* (2013.01); *B01J 20/20* (2013.01); *B01D 2257/708* (2013.01); *B01D 2257/90* (2013.01); *B01D 2258/06* (2013.01)

(58) Field of Classification Search
CPC .......... B01D 2257/708; B01D 2257/90; B01D 2258/06; B01D 53/04; B01D 53/72; B01D 53/82; B01J 20/20; B01J 20/28045
See application file for complete search history.

(56) References Cited

U.S. PATENT DOCUMENTS

| | | | | |
|---|---|---|---|---|
| 3,411,273 | A | * 11/1968 | Duncan | B01D 45/16 55/481 |
| 3,727,384 | A | 4/1973 | Feldman | |
| 3,792,571 | A | * 2/1974 | Waki | B01D 47/00 261/100 |
| 4,420,316 | A | 12/1983 | Frost et al. | |

(Continued)

*Primary Examiner* — Christopher P Jones
(74) *Attorney, Agent, or Firm* — Jason H. Foster; Kremblas & Foster

(57) ABSTRACT

A filter contains fluent particulate, such as carbon granules. The filter is divided into a plurality of cell chambers by walls, including an upper wall. The upper wall has a surface that faces, and is closest to, the top surface of the particles. The upper wall surface is oriented so that, as the particles settle, any gap formed between the top surface of the particles and a portion of the upper wall surface will not extend from the upstream to the downstream sides of the filter. Instead, contact is maintained between the top surface of the particles and the upper wall surface during fluid flow through the filter, and therefore any gas flowing through the frame must flow through, and through spaces around, particles. An angle between the upper wall surface and the flow direction of gas striking the filter is greater than about three degrees.

12 Claims, 7 Drawing Sheets

(56) References Cited

U.S. PATENT DOCUMENTS

| | | | | |
|---|---|---|---|---|
| 4,544,384 | A | * | 10/1985 | Metschl .............. B01D 53/0423 96/130 |
| 4,737,173 | A | | 4/1988 | Kudirka et al. |
| 4,783,958 | A | | 11/1988 | Borja |
| 4,917,862 | A | | 4/1990 | Kraw et al. |
| 5,302,354 | A | * | 4/1994 | Watvedt ............... B01D 46/002 210/493.1 |
| 5,792,244 | A | * | 8/1998 | Morlec .............. B01D 53/0407 55/521 |
| 2002/0110510 | A1 | * | 8/2002 | Seguin ............... B01D 53/0415 423/210 |
| 2004/0226450 | A1 | * | 11/2004 | Dai ........................ B01D 53/08 96/150 |
| 2006/0130451 | A1 | | 6/2006 | Ding et al. |
| 2007/0012192 | A1 | * | 1/2007 | Pippel ................ B01D 46/0005 96/417 |
| 2011/0117002 | A1 | * | 5/2011 | Dardas ............... B01D 53/0423 423/245.1 |
| 2011/0198055 | A1 | * | 8/2011 | Meirav ............. B01D 53/0462 165/59 |
| 2013/0305929 | A1 | * | 11/2013 | Malik ................ B01D 53/0423 96/152 |
| 2016/0074803 | A1 | * | 3/2016 | Gebald .............. B01D 53/0446 95/139 |
| 2016/0220949 | A1 | * | 8/2016 | Tripodi .................. B01D 3/008 |

\* cited by examiner

APPARATUS AND METHOD FOR AVOIDING FLUID BYPASS IN PARTICULATE FILTERS

CROSS-REFERENCES TO RELATED APPLICATIONS

This application claims the benefit of U.S. Provisional Application No. 62/029,049 filed Jul. 25, 2014. The above prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to gas filtration and the removal of compounds from gases using particulate matter, and more particularly to a frame or other structure for retaining particulate matter through which the gas is forced to reduce and/or remove compounds from the gas without the gas bypassing the particulate through large gaps between the particulate and the frame.

Filters are commonly produced that contain granular, pelletized, or particulate media that are designed to remove Volatile Organic Compounds (VOCs), odors or any other air-born contaminants that cannot be removed by mechanical or electrostatic filtration methods. As shown in FIGS. 1 and 2, these conventional filters may be made of a corrugated paper product frame with pockets or "cells" that contain the filtration medium particulate 8. The filter 1 may be made using an injection molded plastic frame that holds the particulate in multiple cells. Upper wall 2, lower wall 3 and lateral walls 4 define each of the cells and the walls 2-4 retain a quantity of filtration medium particulate 8 between upstream and downstream mounted, gas-permeable media 5 and 6 (see FIG. 2) that contain the particles of the particulate 8 that are larger than the pores in the media. The air, gas or liquid passing through the particulate follows a path that is perpendicular to the planar major face of the filter.

The particulate is sometimes referred to herein as "carbon" because carbon is the most common material used for this filtration purpose. Air that has greater contact with the carbon is more desirable because carbon removes more odors and VOCs from the airstream in a given time frame than many other such particles. Granular carbon is commonly used in such filters to capture odors and VOCs from air as the air is forced through a particulate bed. As described above, conventional granular or pelletized carbon filters employ a carrier system which typically includes multiple sidewall baffles that are aligned substantially parallel to the air stream, which is substantially perpendicular to the upstream media 5. The baffles, which are the walls 2-4, distribute the carbon particulate across the entire volume of the filter and hold the carbon in place when the filter is placed in various orientations. The nature of the cells is that the faces of the upper and lower walls 2-3 that the particulate seats against and that define the cells 8 are substantially perpendicular to the planar face of the filter frames as shown in FIGS. 1 and 2. Stated differently, the angle A of FIG. 2 is conventionally about 90 degrees, and, to the inventor's knowledge, is always substantially perpendicular, which is between about 87 and about 93 degrees even taking manufacturing tolerances into consideration.

The most common orientation for such filters during use is vertical. Because of the force of gravity, within each baffle set, or cell, the carbon particulate may settle to the bottom of the cell. This leaves an open space S at the top of each cell where air can pass through without coming into contact with the carbon. The filtration medium is loaded into the cells of the filters when the main plane of each filter is in a horizontal orientation, but when the filters are in use they are in a substantially vertical orientation. The geometric nature of the cells allows the carbon to settle and create a visible void where substantial amounts of air can move through the filter without being forced to go through the carbon. This condition is called "bypass" within the filtration industry and is illustrated in FIG. 2 as the line "B". The problem with bypass is that a substantial amount of gas can pass through the open space S of the filter without being affected by the carbon particles. This produces poor odor and VOC reduction results. Therefore, the need exists for a superior filter frame to reduce or prevent such bypass.

BRIEF SUMMARY OF THE INVENTION

A filter apparatus is disclosed that contains one or more of any of the fluent particulate described herein, such as carbon granules. Fluent materials flow, which can result in settling of the particles into an overall volume that is slightly smaller than the original volume, resulting in the top surface of the particles settling downwardly. The filter is divided into a plurality of cell chambers by walls, including at least an upper wall. The upper wall has a surface that faces, and is closest to, the top surface of the particles. The upper wall surface is oriented so that, as the particles settle, any gap formed between the top surface of the particles and a portion of the upper wall surface will not extend from the upstream to the downstream sides of the filter frame. Contact is maintained between the top surface of the particles and at least a portion of the upper wall surface during fluid flow through the filter, and therefore any gas flowing through the frame must flow through, and through spaces around, particles.

In one embodiment of the invention, the upper wall surface is strategically oriented relative to the upstream face of the frame when the frame is in a vertical orientation, such as when gas flows through the frame substantially perpendicular to the upstream face. The upper wall surface is preferably oriented at least greater than about 93 degrees relative to the upstream face. It is also contemplated to strategically orient the upper wall surface relative to vertical, represented by an imaginary vertical line that is perpendicular to gas flow against the upstream face of the filter. In this configuration, the upper wall surface is preferably oriented at least greater than about 93 degrees relative to vertical.

It is also contemplated to strategically orient the upper wall surface relative to the direction of gas flow striking the upstream face of the filter. In this configuration, the upper wall surface is oriented at least greater than about 3 degrees relative to the direction of gas flow. In all cases, the orientation and shape of the upper wall surface is such that any settling of the fluent particulate matter does not cause a gap to open that forms a complete path from the upstream to the downstream faces of the particulate that avoids contact with the particulate. Thus, all gas flowing through the filter must contact at least some of the particles.

Each cell is filled with carbon particulate or any other particulate that the fluid to be filtered desirably makes contact with. At some point prior to use, such as during manufacture, the filter is oriented in a horizontal or other non-vertical orientation. When the filter is moved to a vertical position for use, the shape and angled upper walls of the cells prevent the carbon from settling and creating an open space where gas that passes through the filter (in a path that begins substantially perpendicular to the major surface of the filter) can move through the filter without being forced through the particulate material.

Figure 1:
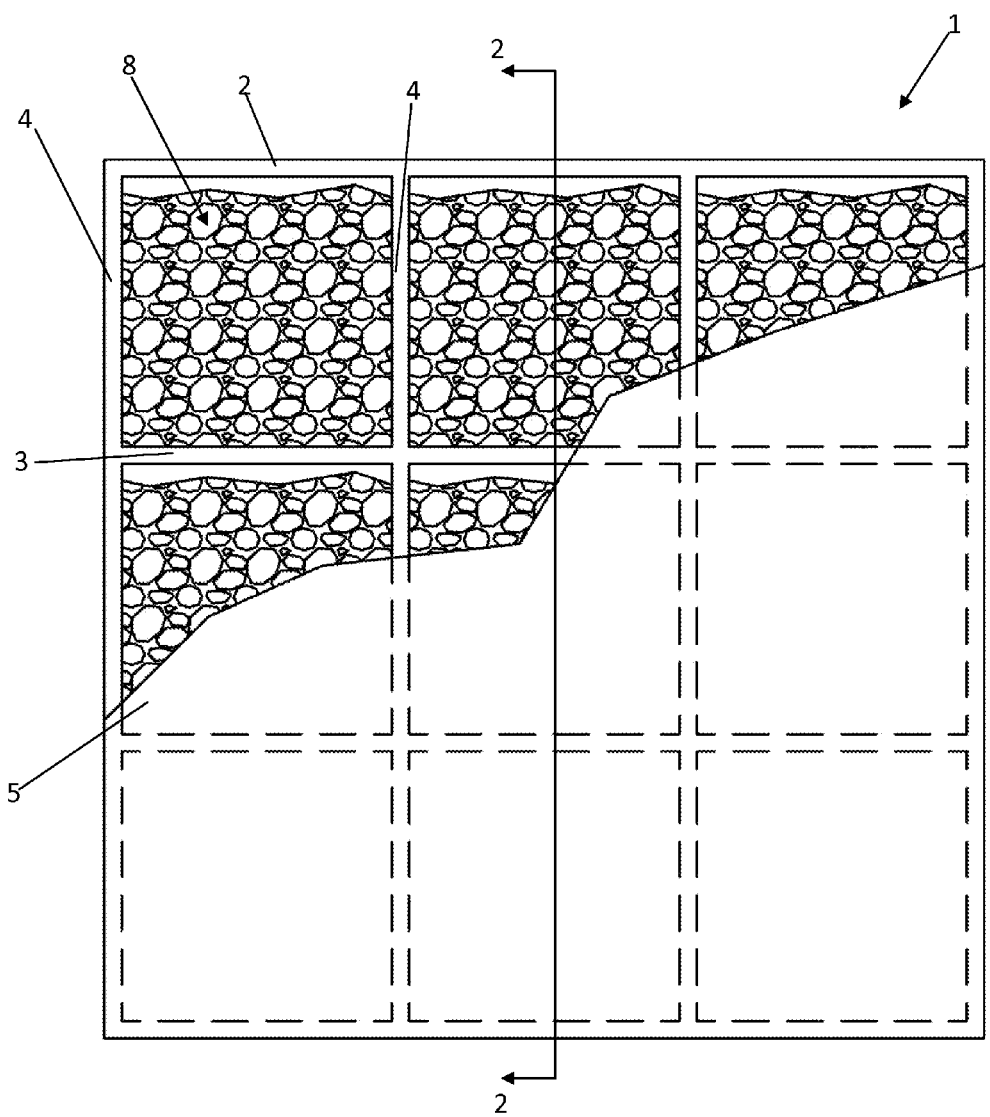
FIG. 1 is a front cutaway view illustrating a prior art filter frame.
Figure 2:
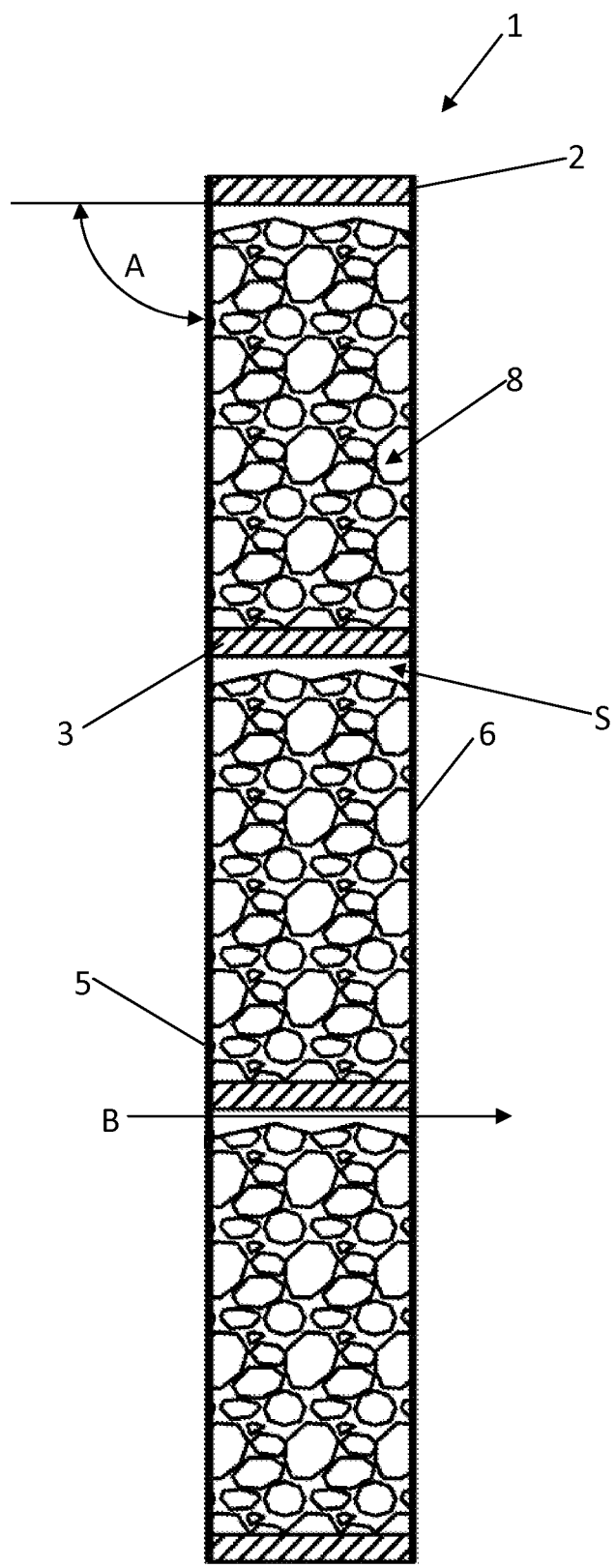
FIG. 2 is a side view in section illustrating the prior art filter frame through the line 2-2 of FIG. 1.
Figure 3:
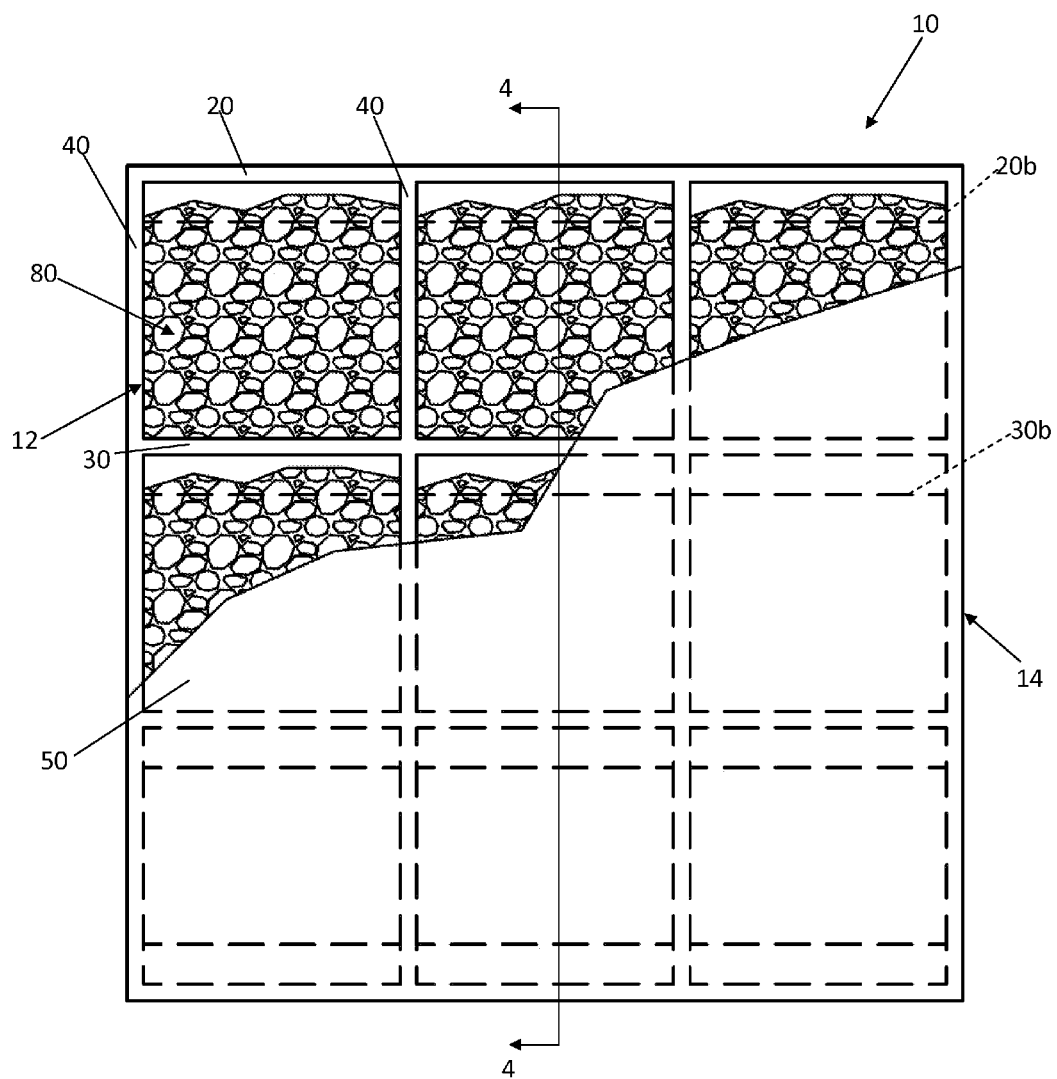
FIG. 3 is a front cutaway view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Patent application Ser. No. Application No. 62/029,049 filed Jul. 25, 2014 is incorporated in this application by reference.

A filter 10 is made in accordance with the present invention, and has a plurality of baffles or cells formed in the frame 14. The frame may be made of any rigid material, such as paper, plastic or any other suitable filtration frame material. The frame may be about one-half to about two inches thick and can be made to any common width and height, such as twenty inches high by twenty inches wide. A person of ordinary skill will understand that virtually any thickness, height and width combination can be manufactured and used.

Each of the cells is a chamber that contains a quantity of particulate matter 80 and is defined by walls, such as the walls above, below and on both sides of each cell, and gas-permeable media on the upstream and downstream sides. The frame walls are preferably gas and particulate impermeable, but the media on the upstream and downstream sides are gas-permeable to permit gas to flow therethrough with little to no restriction. The gas also flows through the particles themselves, or through the gaps formed around the particles where contact is made with other particles, or both. The particulate 80 contained in each cell cannot pass through the openings in the upstream and downstream sides of the filter due to the greater size of the particles than the media openings.

Figure 4:
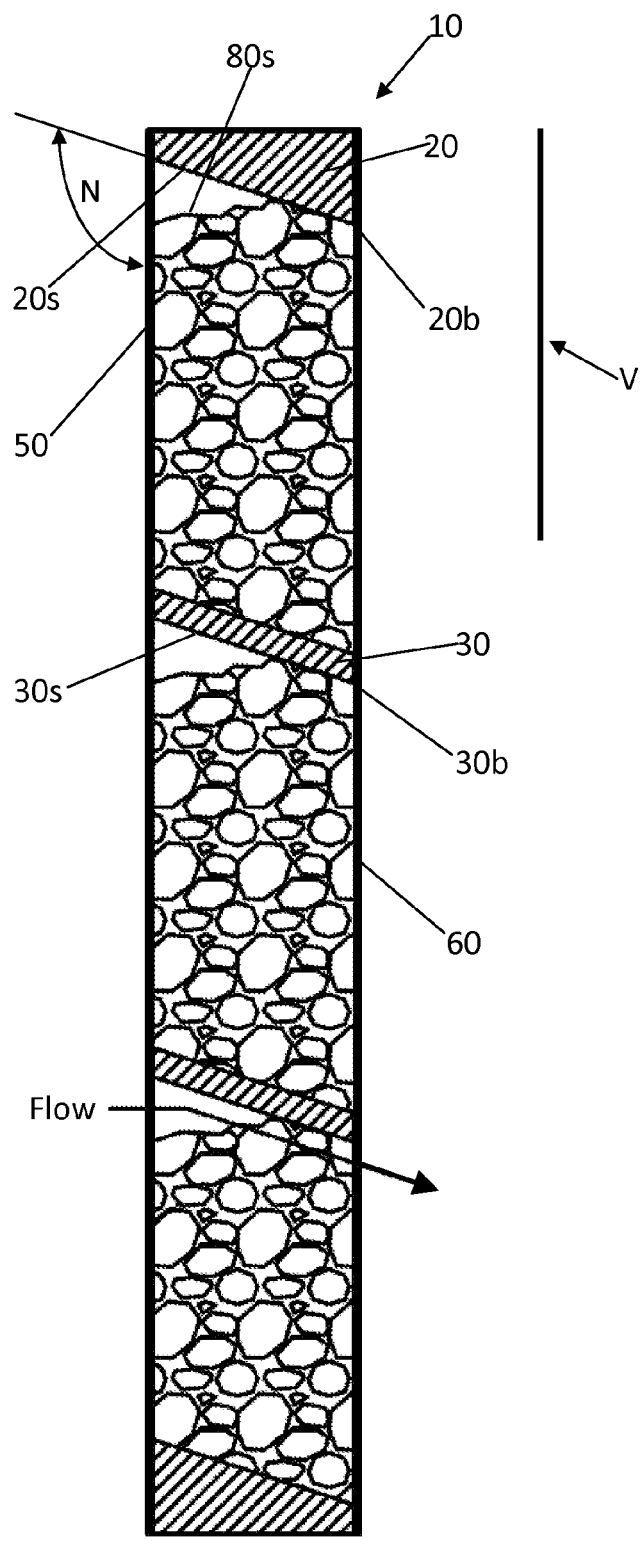
FIG. 4 is a side view in section illustrating the embodiment of FIG. 1 through the line 4-4 of FIG. 3.
Figure 5:
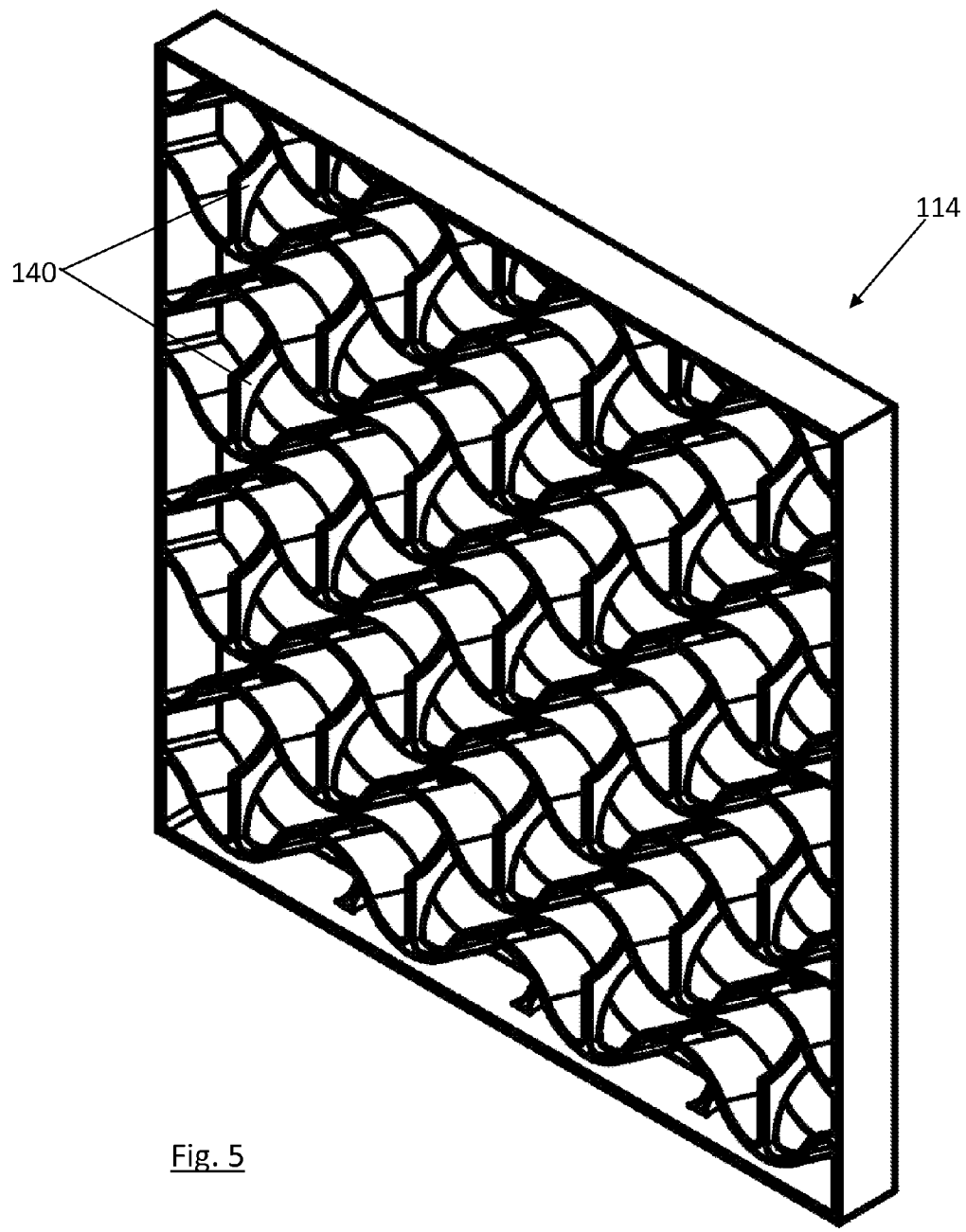
FIG. 5 is view in perspective illustrating an embodiment of the present invention.
Figure 6:
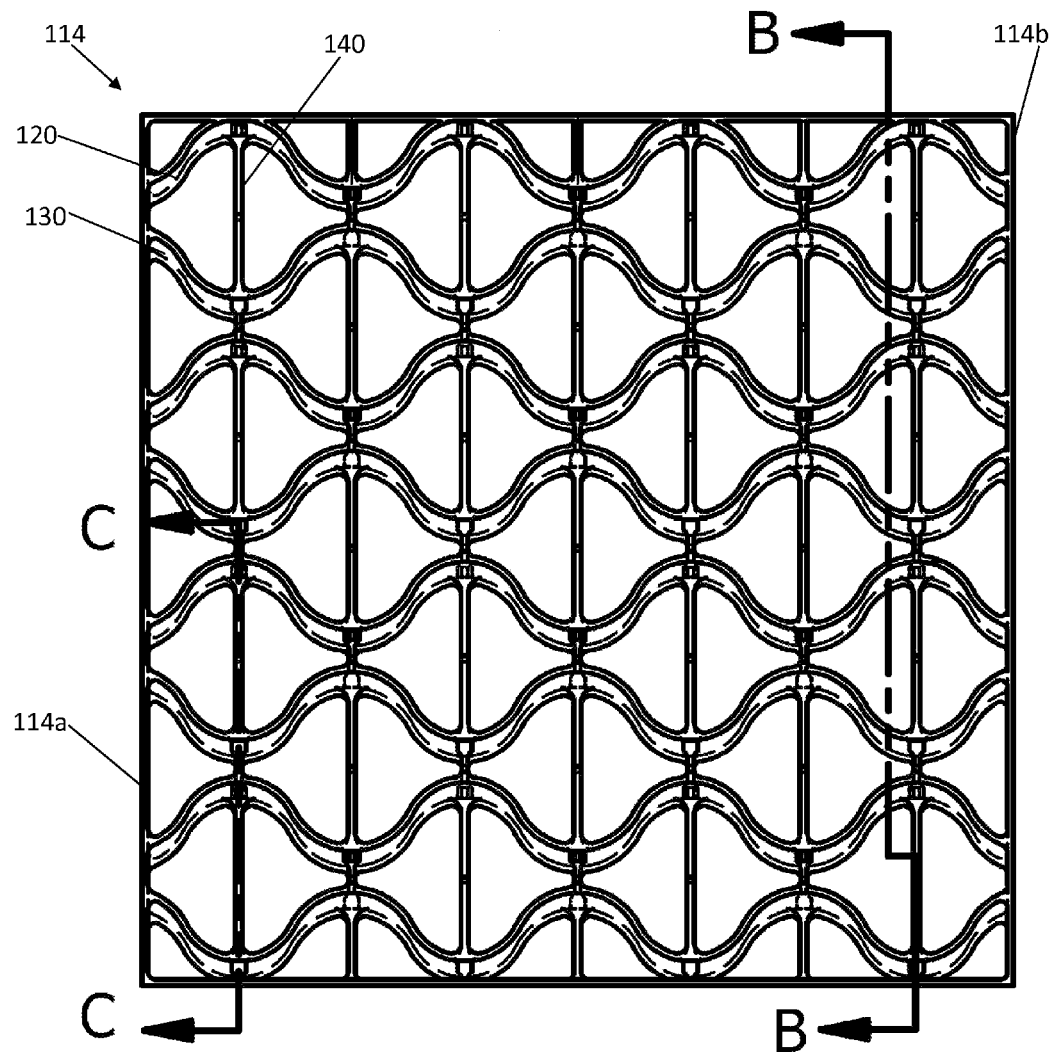
FIG. 6 is a front view illustrating the embodiment of FIG. 5.
Figure 7:
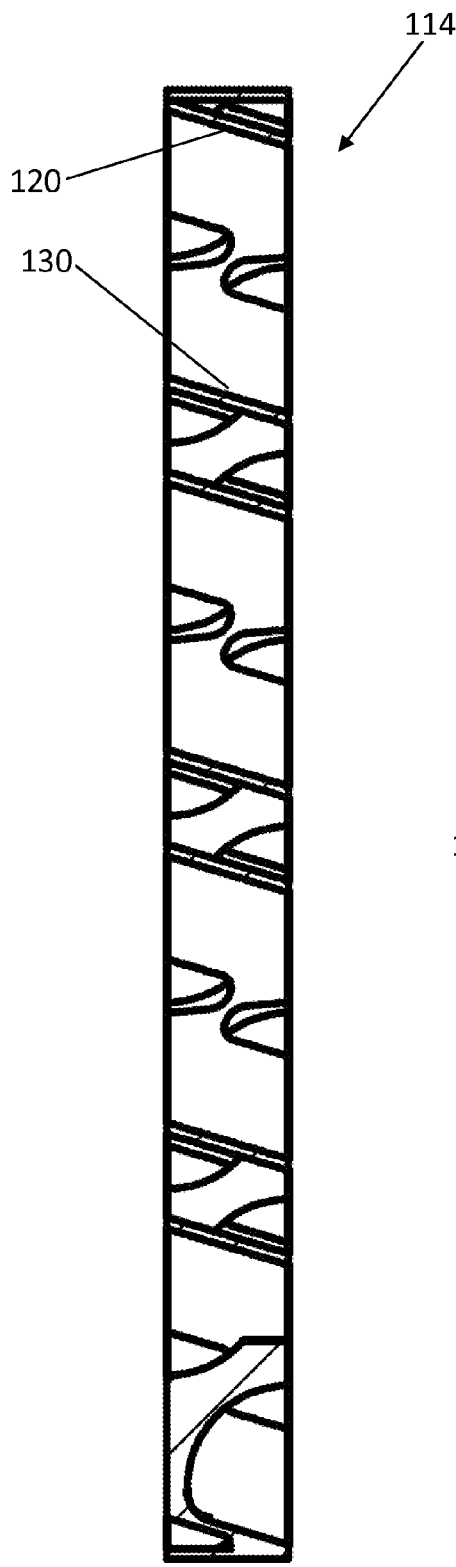
FIG. 7 is a side view in section illustrating the embodiment of FIG. 6 through the line B-B.
Figure 8:
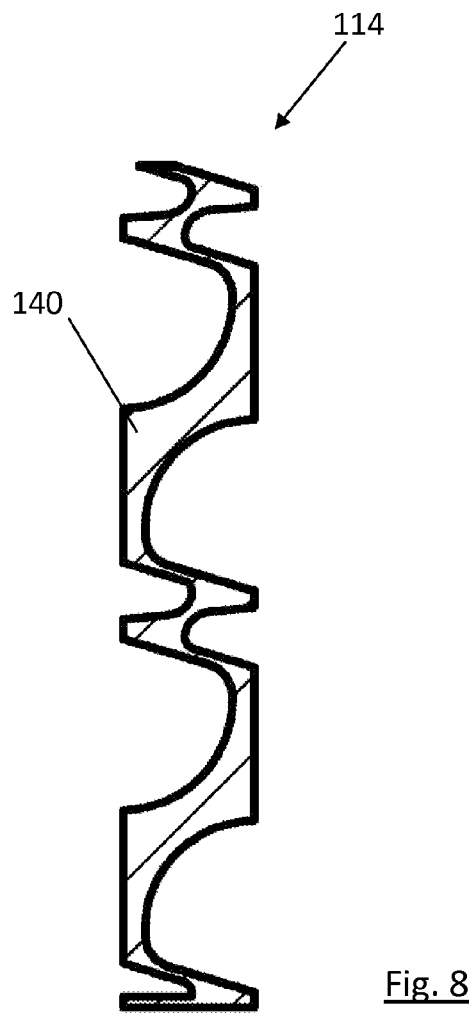
FIG. 8 is a side view in section illustrating the embodiment of FIG. 6 through the line C-C.

An example cell 12 has an upper wall 20, a bottom wall 30 and lateral sidewalls 40. The cell 12 has an upstream media layer 50 and downstream media layer 60 mounted to the upstream and downstream surfaces of the frame 14, respectively. As noted above, the layers 50 and 60 are gas-permeable but are not permeable by the particulate 80 in the size in which the particulate 80 is used. Therefore, no particulate is lost during use of the filter 10, in which the filter 10 is oriented substantially vertically (as shown in FIG. 4) in a passage, such as an HVAC duct, with sidewalls spaced about the same distance as the peripheral edges of the filter 10, and a gas is forced into the filter 10 in a direction along a line perpendicular to the media layer 50. Because of the construction of the walls 20, 30 and 40, along with the media layers 50 and 60, substantially all particulate 80 remains in the cell 12 during use of the filter 10.

As shown in FIG. 4, at least the upper wall 20 in each of the cells is formed having a surface 20s (with comparable surfaces in lower cells, such as the surface 30s) that is substantially non-parallel to the gas stream direction, which is non-perpendicular to the media layer 50. The lower wall 30 can have a similar orientation to the wall 20, but the lateral walls 40 are preferably substantially perpendicular to the media layer 50, or parallel to the gas stream direction. It is preferred that the surface 20s is oriented at least over three degrees greater than parallel to the direction of gas flow. This orientation may be at least over three degrees greater than perpendicular to the upstream media layer 50, which media layer 50 is substantially parallel to the upstream major surface of the frame 14 to which the media layer 50 is mounted. Thus, the upper wall surface 20s is at least about greater than 93 degrees relative to the media layer 50, as shown in FIG. 4 by the reference numeral N, and relative to any vertical line, such as the line V of FIG. 4 when the filter is vertically oriented as in FIG. 4.

Because the surface 20s is angled as described, even if the particulate matter 80 settles (downwardly in the illustration of FIG. 4), the substantially horizontal top surface 80s of the particulate in the cell 12 still contacts the upper wall surface 20s, at least at the portion of the surface 20s near the downstream media layer 60. This contact prevents the formation of a path for gas to flow through the filter 10 without contacting at least some of the particulate 80, which could occur if the top surface 80s settled below the rear surface 20b of the upper wall 20. But the structure herein prevents settling below 20b.

The upper wall surface 20s faces the top surface 80s of the particulate 80 in the cell 12, and contacts at least a portion of the top surface 80s, even after settling away from the surface 20s by the fluent particulate 80. Thus, as the surface 20s guides the gas that strikes the media layer 50 perpendicularly and then slightly offset from perpendicular, as shown schematically by the term "Flow" and a re-directed arrow in the lowest cell of FIG. 4, the gas flows through at least the portion of the thickness of the particulate 80 that contacts the downstream portion of the surface 20s. Because the air (or any other gas) stream direction is preferably perpendicular to the upstream media layer 50 when the air strikes the media layer 50, the orientation of the surface 20s re-directs the air slightly through the particulate 80 so that, even if the particulate 80 settles to form a gap, the gas flows through at least some particulate. This re-direction of the gas does not cause a substantial increase in pressure drop across the filter 10, at least in part because there is little resistance to the air passing through the gap in the first portion of the space created by settling, but also because the angle of the surface 20*s*, and all other similar surfaces, are not extreme enough to cause a large pressure drop.

In the embodiment of FIG. 4, the airstream direction upon striking the upstream media layer 50 is preferably substantially perpendicular to the upstream media layer 50 as shown. When the filter 10 is placed in a vertical orientation, whether for storage, transport or use, and the particulate settles downwardly due to the force of gravity and possibly vibration, the angled upper cell walls of the filter 10 prevent the carbon in the cells from creating openings that allow bypass as in the prior art. Thus, all air or other gas that flows through the filter has a much greater likelihood of coming into contact with the carbon.

The filter 10 has multiple cells, each of which contains carbon or any other particulate that air, gas or liquid desirably contacts while passing through the filter. The person of ordinary skill will understand that all cells in a filter can be substantially identical, as shown in the filter 10, or they can be modified to be larger or smaller than other cells in the same filter. Alternatively, the angles of the upper wall surfaces can be the same or different from cell to cell, even though the angles of the upper wall surfaces of all cells in the filter 10 are shown to be the same, which is preferred.

The upper walls of the cells are substantially offset from perpendicular to the major surface of the filter that is facing the flow of gas. This means that the upper walls of the cells are substantially non-parallel to the flow direction of air, gas or liquid striking the filter 10. The angle N between the upper wall surface 20*s* and the major face of the filter 10 is greater than 93 degrees, such as 94, 95, 96 or 100 degrees or more. In an alternative embodiment (not shown), the angle between an upper wall surface and the major face of the filter is less than 87 degrees. The offset from parallel to the air flow, or perpendicular to the major face of the filter, can be as little as a few degrees, depending on the filter thickness, and is preferably 4, 5, 6, 7, 8, 9 or 10 degrees or greater. Regardless of the exact angle, the person of ordinary skill will understand that the angle is sufficient to ensure that preferably at least 90%, more preferably at least 95%, still more preferably at least 97%, and most preferably about 100% of the fluid passing through the filter contacts particulate medium in the filter.

There are no limits to the shape of each cell. Examples include, round, square, triangular, curved, trapezoid, irregular, or any shape that can be conceived that will act as a cell used to hold carbon or any other desirable particulate. The size and depth of the filter containing the cells is also not limited; the length, width, and depth dimensions are not limited to any specific size range. The material of the filter frame is also not limited, and may be plastic, paper, metal, carbon, or any other suitable material.

Another example of a frame from which a filter made according to the invention may be made is the frame 114 shown in FIGS. 5-8. The frame 114 has a plurality of cells defined, in part, by the substantially curved walls 120 and 130. The walls 120 and 130 provide the upper boundaries for two of the cells, which extend laterally from one side of the frame 114 to the opposite side of the frame. Because the members 140 extend to the upstream face of the frame 114, and to the downstream face, but do not completely separate the cells, the members 140 do not form lateral boundaries to cells, and are to support the media layers at the upstream and downstream sides. The only sidewalls that retain particulate from lateral flow are the peripheral frame members 114*a* and 114*b*. Thus, particulate in the frame 114 is retained in cells defined by the horizontally-oriented pairs of vertically-spaced members, such as between the walls 120 and 130, and between the peripheral frame members 114*a* and 114*b*.

As can be seen in FIG. 6, the walls 120 and 130 form angled surfaces at the tops of each chamber below them, thereby forming an angled surface relative to the particulate (not shown) that would be placed beneath each member. Thus, the angled surfaces of the walls 120 and 130 provide the benefits described above with the filter 10.

A filter made according to the invention thus contains a granular or pelletized medium that is designed to remove VOCs, odors and/or any gas or air-born contaminants. Typically such contaminants are not removed by mechanical or electrostatic filtration methods. The upper cell walls of the filter are more or less than substantially perpendicular to the major, planar surface of the filter, thus leaving the upper cell walls non-parallel to the path of fluid flow striking the filter. The shape of the cell and the angle of the cell's upper wall are such that when the filtration medium is loaded into the filter and then oriented in a vertical position, the natural settling of the particulate does not create a void through which a substantial amount of air can pass without being forced through the carbon or other particulate bed. Instead, the shape of the cell and the angle of the upper cell walls create a condition in which substantially all gas or air that moves through the filter is forced into contact with the filtration medium contained within the filter.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A filtration apparatus containing fluent particles that chemically modify compounds in gases that make contact with the particles, the apparatus comprising:

(a) a frame divided into a plurality of cell chambers, each cell chamber containing a quantity of the particles, each cell chamber defined by at least an upper wall that is positioned above a top surface of the respective quantity of the particles when the frame is oriented substantially vertically in operable orientation, the upper wall having an upper wall surface that faces, and contacts, at least a portion of the top surface of the respective quantity of particles; and (b) the upper wall surface forms an angle with an upstream face of the frame that is greater than about 93 degrees, and the upstream face of the frame contacts the respective quantity of the particles, thereby forcing all gas flowing through the frame to flow in contact with at least some of the particles.

2. The filtration apparatus in accordance with claim 1, wherein each cell chamber is further defined by a lower wall that is positioned below the quantity of the particles when the frame is oriented substantially vertically in operable orientation and lateral walls positioned on opposite sides of the quantity of the particles, and at least the lateral walls have surfaces that are substantially perpendicular to the upstream face of the frame.

3. The filtration apparatus in accordance with claim 2, wherein a first fluid-permeable media layer that is impermeable to the fluent particles is mounted on the upstream side of the frame to retain the particles in each cell chamber, and a second fluid-permeable media layer that is impermeable to the fluent particles is mounted on the downstream side of the frame to retain the particles in each cell chamber.

4. A filtration apparatus containing fluent particles that chemically modify compounds in gases that make contact with the particles, the apparatus comprising:
(a) a frame divided into a plurality of cell chambers, each cell chamber containing a quantity of the particles, each cell chamber defined by at least an upper wall that is positioned above a top surface of the respective quantity of the particles when the frame is oriented substantially vertically, the upper wall having an upper wall surface that faces, and contacts, at least a portion of the top surface of the respective quantity of particles; and
(b) the upper wall surface forms an angle with gas flowing through the frame that is greater than about 3 degrees, and the upstream face of the frame contacts the respective quantity of the particles, thereby forcing all gas flowing through the frame to flow in contact with at least some of the particles.

5. The filtration apparatus in accordance with claim 4, wherein each cell chamber is further defined by a lower wall that is positioned below the quantity of the particles when the frame is oriented substantially vertically in operable orientation and lateral walls positioned on opposite sides of the quantity of the particles, and at least the lateral walls have surfaces that are substantially perpendicular to the upstream face of the frame.

6. The filtration apparatus in accordance with claim 5, wherein a first fluid-permeable media layer that is impermeable to the fluent particles is mounted on the upstream side of the frame to retain the particles in each cell chamber, and a second fluid-permeable media layer that is impermeable to the fluent particles is mounted on the downstream side of the frame to retain the particles in each cell chamber.

7. A filtration apparatus containing fluent particles that chemically modify compounds in gases that make contact with the particles, the apparatus comprising:
(a) a vertical frame divided into a plurality of cell chambers, each cell chamber containing a quantity of the particles, each cell chamber defined by at least an upper wall that is positioned above a top surface of the respective quantity of the particles, the upper wall having an upper wall surface that faces, and contacts, at least a portion of the top surface of the respective quantity of particles; and
(b) the upper wall surface forms an angle with vertical that is greater than about 93 degrees, thereby forcing all gas flowing through the frame to flow in contact with at least some of the particles.

8. The filtration apparatus in accordance with claim 7, wherein each cell chamber is further defined by a lower wall that is positioned below the quantity of the particles when the frame is oriented substantially vertically in operable orientation and lateral walls positioned on opposite sides of the quantity of the particles, and at least the lateral walls have surfaces that are substantially perpendicular to the upstream face of the frame.

9. The filtration apparatus in accordance with claim 8, wherein a first fluid-permeable media layer that is impermeable to the fluent particles is mounted on the upstream side of the frame to retain the particles in each cell chamber, and a second fluid-permeable media layer that is impermeable to the fluent particles is mounted on the downstream side of the frame to retain the particles in each cell chamber.

10. A filtration apparatus containing fluent particles that chemically modify compounds in gases that make contact with the particles, the apparatus comprising: (a) a substantially vertical frame divided into a plurality of cell chambers, each cell chamber containing a quantity of the particles, each cell chamber defined by at least an upper wall that is spaced from a top surface of the quantity of particles, the upper wall having an upper wall surface that faces, and contacts at least a portion of the top surface of the respective quantity of particles; and (b) the upper wall surface has a shape and orientation that, if the quantity of particles settles to space the respective top surface of the quantity of particles away from a first portion of the upper wall surface, at least a second portion of the upper wall surface maintains contact with the respective top surface of the quantity of particles, thereby forcing all gas flowing through the frame to flow in contact with at least some of the particles, wherein the upper wall surface is oriented relative to the flow of gas striking the frame by at least three degrees.

11. The filtration apparatus in accordance with claim 10, wherein each cell chamber is further defined by a lower wall that is positioned below the quantity of the particles when the frame is oriented substantially vertically in operable orientation and lateral walls positioned on opposite sides of the quantity of the particles, and at least the lateral walls have surfaces that are substantially perpendicular to the upstream face of the frame.

12. The filtration apparatus in accordance with claim 11, wherein a first fluid-permeable media layer that is impermeable to the fluent particles is mounted on the upstream side of the frame to retain the particles in each cell chamber, and a second fluid-permeable media layer that is impermeable to the fluent particles is mounted on the downstream side of the frame to retain the particles in each cell chamber.

* * * * *